United States Patent
Tor et al.

(10) Patent No.: US 9,344,432 B2
(45) Date of Patent: *May 17, 2016

(54) NETWORK LAYER CLAIMS BASED ACCESS CONTROL

(75) Inventors: Yair Tor, Shorashim (IL); Daniel Rose, Modiin (IL); Eugene (John) Neystadt, Kfar-Saba (IL); Patrik Schnell, Issaquah, WA (US); Moshe Sapir, Haifa (IL); Oleg Ananiev, Migdal Haemeq (IL); Arthur Zavalkovsky, Netanya (IL); Anat Eyal, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 393 days.

This patent is subject to a terminal disclaimer.

(21) Appl. No.: 12/822,724

(22) Filed: Jun. 24, 2010

(65) Prior Publication Data

US 2011/0321130 A1    Dec. 29, 2011

(51) Int. Cl.
*H04L 29/06* (2006.01)
*G06F 15/16* (2006.01)
*G06F 21/33* (2013.01)
*G06F 21/41* (2013.01)

(52) U.S. Cl.
CPC ............ *H04L 63/102* (2013.01); *H04L 63/164* (2013.01); *G06F 21/33* (2013.01); *G06F 21/41* (2013.01); *H04L 63/0807* (2013.01); *H04L 63/0823* (2013.01); *H04L 63/10* (2013.01); *H04L 63/107* (2013.01)

(58) Field of Classification Search
CPC . H04L 63/0807; H04L 63/0823; H04L 63/10; H04L 63/107; G06F 21/33; G06F 21/41
USPC .................. 726/1–7, 10–15; 709/223–226
See application file for complete search history.

(56) References Cited

U.S. PATENT DOCUMENTS

| | | | | |
|---|---|---|---|---|
| 7,272,625 | B1 * | 9/2007 | Hannel et al. | 709/200 |
| 7,698,566 | B1 * | 4/2010 | Stone | 713/186 |
| 2002/0069278 | A1 | 6/2002 | Forslow | |
| 2007/0245409 | A1 | 10/2007 | Harris et al. | |

(Continued)

FOREIGN PATENT DOCUMENTS

| CN | 1770769 A | 5/2006 |
|---|---|---|
| WO | 2007/000772 A1 | 1/2007 |

OTHER PUBLICATIONS

EnterpriseWAN Tips: http://searchenterprisewan.techtarget.com/tip/0,289483,sid200_gci1245936,00.html, Published Mar. 15, 2007, 5 pages.

(Continued)

*Primary Examiner* — Alexander Lagor
(74) *Attorney, Agent, or Firm* — Kate Drakos; Aneesh Mehta; Micky Minhas (57) ABSTRACT

Embodiments of the invention provide techniques for basing access control decisions at the network layer at least in part on information provided in claims, which may describe attributes of a computer requesting access, one or more resources to which access is requested, the user, the circumstances surrounding the requested access, and/or other information. The information may be evaluated based on one or more access control policies, which may be pre-set or dynamically generated, and used in making a decision whether to grant or deny the computer access to the specified resource(s).

20 Claims, 5 Drawing Sheets

(56) References Cited

U.S. PATENT DOCUMENTS

| | | | |
|---|---|---|---|
| 2008/0002696 A1* | 1/2008 | Claessens et al. | 370/392 |
| 2009/0064287 A1 | 3/2009 | Bagepalli et al. | |
| 2010/0037304 A1* | 2/2010 | Canning et al. | 726/7 |
| 2010/0042656 A1 | 2/2010 | Gajjala et al. | |
| 2010/0138908 A1* | 6/2010 | Vennelakanti et al. | 726/11 |

OTHER PUBLICATIONS

Enterprise Remote Access: http://www.f5.com/pdf/white-papers/enterprise-remote-access-wp.pdf, Published Oct. 19, 2007, 5 pages.
Why Replace Your IPSec for Remote Access: http//:www.sonicwall.com/downloads/WP-ENG-035_Why-Replace-Your-IPSec_US.pdf, Published Jan. 1, 2009. 10 Pages.
IPSec Authentication and Authorization Models: http://ptgmedia.pearsoncmg.com/images/1587051117/samplechapter/158051117content.pdf, Published Oct. 21, 2005. pp. 89-107.
WISDOM Advances Security Measures: http://www.wireless-center.net/Wi-Fi-Security/3129.html, Published Dec. 24, 2007. 6 Pages.
OpenRG TM for Wireless Gateways and Access Points: http://www.krftech.com/openrg/datasheets/jungo_dsheet_wireless_ap.pdf, Published Jan. 1, 2005. 2 Pages.
Core Clientless Web Access for SA 700-SA700-CORE: http://www.nscreensales.com/Core_Clientless_Web_Access_for_SA_700_p/sa700-core.html, Published Jun. 7, 2009. 2 Pages.
"First Office Action Received in China Patent Application No. 201110184790.X", Mailed Date: Apr. 21, 2015, 13 Pages.
Second Office Action Issued in Chinese Patent Application No. 201110184790.X, Mailed Date: Dec. 11, 2015, 12 Pages.

* cited by examiner

FIG. 5

NETWORK LAYER CLAIMS BASED ACCESS CONTROL

BACKGROUND

Conventionally, access control decisions concerning whether a computer is granted access to a network are typically based at least in part on whether the computer meets certain system health requirements. In this respect, failure to keep computers that connect to a network up-to-date (e.g., equipped with the latest operating system updates, anti-virus signatures, etc.) is one of the most common ways that the integrity of the network may be jeopardized. For example, a computer that is not kept up-to-date may be vulnerable to malicious software which, when the computer connects to the network, can expose network resources to attacks and/or viruses. Thus, network administrators commonly specify minimum health requirements that a computer must satisfy to connect to a network. Enforcing these requirements can be difficult, especially given the number of different types of computers which request access, such as home computers, travelling laptops, etc., which are not under the administrator's direct control.

One product that assists administrators with ensuring that computers that access a network satisfy system health requirements is the Network Access Protection (NAP) product offered by Microsoft Corporation of Redmond, Wash. With NAP, administrators can define minimum health requirements that a computer must satisfy to connect, such as whether the computer has the most recent operating system updates installed, is equipped with the latest anti-virus signatures, has firewall software installed and enabled, etc. In a system that employs NAP, when a computer attempts to connect to the network, its health status is evaluated. Computers that comply with health requirements are granted access to the network, such as via the issuance of a certificate indicating compliance with those requirements, or using other techniques. Computers that do not comply are denied access, and may be subject to automatic remediation. For example, non-compliant computers may be automatically updated with missing software updates or configuration changes.

Figure 1:
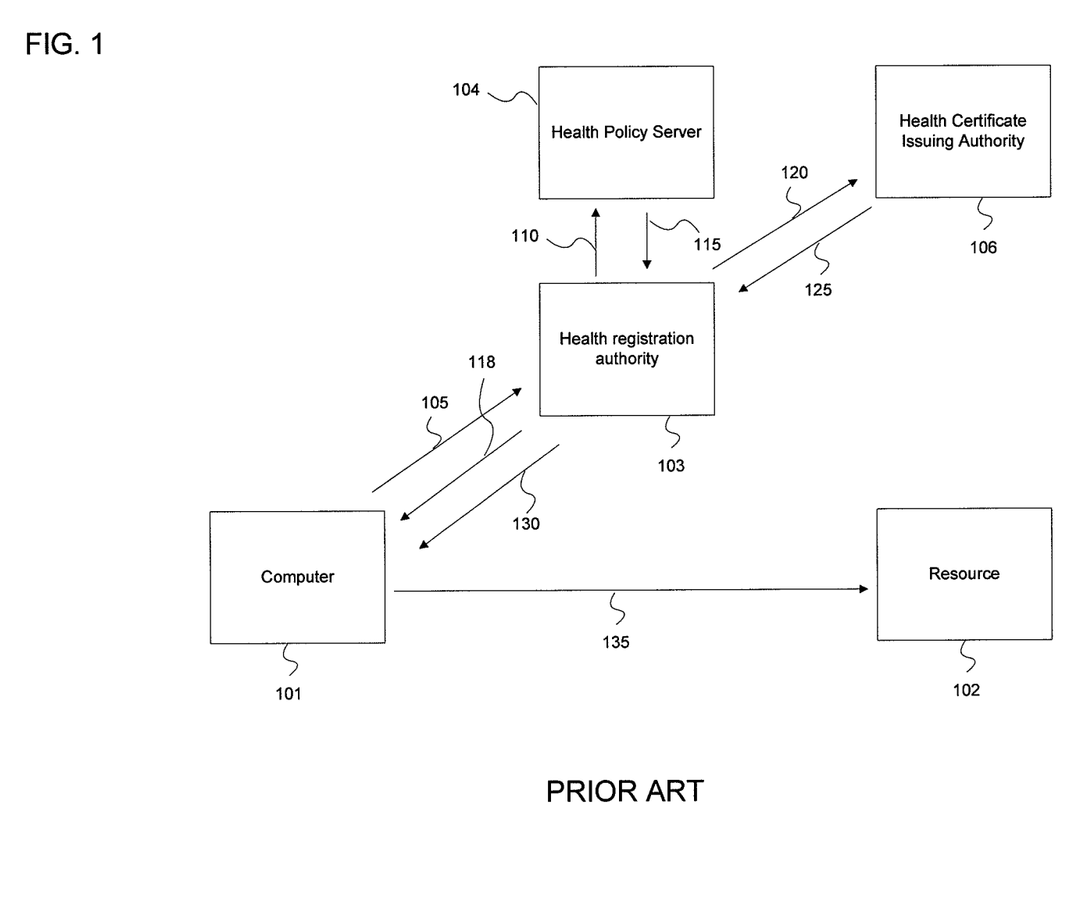
FIG. 1 is a block diagram depicting an example process by which a client requests access to a network resource, in accordance with the prior art.

FIG. 1 is a block diagram depicting an example process whereby a computer attempts access to a network in a system employing NAP. In this process, computer 101 provides information relating to its health to health registration authority (HRA) 103 in act 105, which then passes that information to health policy server 104 in act 110. Health policy server 104 evaluates the information provided by computer 101 to determine whether it complies with system health policy. The results of this evaluation are then sent to HRA 103 in act 115. If computer 101 is compliant, in act 120 HRA 103 obtains a health certificate for computer 101 from health certificate issuing authority 106. The certificate is provided to HRA 103 in act 125, which then transfers it to computer 101 in act 130. Using the certificate, computer 101 may initiate protected communication with resource 102 in act 135, and respond to communications initiated by other compliant computers (not shown in FIG. 1) which authenticate themselves using corresponding health certificates.

If computer 101 is not compliant with system health policy, health policy server 104 informs HRA 103 that access is to be denied, so that HRA 103 does not obtain a certificate for computer 101 from health certificate issuing authority 106. As a result, computer 101 cannot initiate communication with resource 102. Also included with the information provided by health policy server 104 to HRA 103 may be remediation instructions to be executed by computer 101, such as to communicate with a remediation server (not shown in FIG. 1) to obtain components necessary to bring computer 101 into compliance with system health policy. The remediation instructions may be communicated to computer 101 in act 118.

Internet Protocol (IP) Security (IPsec) is a protocol suite used at the network layer of the Open Systems Interconnection (OSI) stack to secure communications that occur over a network in accordance with the IP protocol. A system that employs NAP and IPsec to secure network communications allows computers that comply with health requirements to connect with other computers on the network. Enforcement of NAP policy using IPsec confines communication to compliant computers after they have successfully connected and obtained a valid IP address configuration. In addition, a system that employs IPsec can control access to network resources (e.g., hosts, services, etc.) based on the identity of the device requesting access and/or its user.

SUMMARY

Applicant has appreciated that existing approaches to controlling access to network resources at the network layer are insufficiently flexible. For example, if a system employs a network layer security protocol (e.g., IPsec) to enforce NAP policy, a computer requesting access to the network first reports its health to a health registration authority (HRA), which passes the information to a health policy server that decides whether the computer complies with system health policy. If so, a certificate is issued which the computer attempts a connection to a network resource in accordance with the network layer security protocol. If not, access is denied, and automatic remediation may occur. If the system employs a network layer security protocol but not to enforce NAP policy, then access decisions may be based on the identity of the device and/or its user. In either case, the decision on whether to grant the computer access is binary (i.e., yes/no) in nature, and is based primarily on the identity and/or health of the requesting device and/or its user, rather than on other information which may enable a more flexible approach to access control.

To that end, some embodiments of the invention enable additional flexibility with respect to access control decisions at the network layer through the use of information provided in claims. Claims may provide information in addition to or instead of that which is conventionally employed in making access decisions at the network layer (e.g., device identity and/or health and user identity). For example, claims may provide information on any of numerous attributes of the computer requesting access, the user on behalf of which the request is made, the one or more resources to which access is requested (e.g., IP addresses, ports, etc.), the circumstances surrounding the requested access (e.g., the location of the requesting computer), and/or other information. The information provided in the claims may be evaluated based on one or more access control policies, which may be pre-set or dynamically generated, and may be used in making a decision whether to grant or deny a computer access. Thus, more detailed information may be used in making access control decisions at the network layer, enabling greater flexibility in creating access control policies and making access control decisions. As but one example, a computer that does not satisfy system health requirements which is employed by a user in a particular role may be granted limited access to the network (e.g., to only certain resources specified by a policy). Policies governing access control to any resource(s) may be flexibly formulated to take into account information of any nature or type, as embodiments of the invention are not limited in this respect.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Some embodiments of the invention enable greater flexibility with respect to access control decision-making at the network layer than conventional techniques allow. In some embodiments, this additional flexibility is achieved through the use at the network layer of claims, or "assertions," as is known in the authentication and security arts. In one example, a request issued by a computer to access a network resource in accordance with a network layer security protocol (e.g., IPsec, Secure Sockets Layer (SSL), etc.) may result in a request being issued by the computer for claims from one or more claims providers. These "requester claims" may describe any of numerous attributes of the computer, its user, the circumstances surrounding the access request, and/or other information. For example, the claims may identify the computer's user's role, organizational affiliation, whether the computer is equipped with operational security software, whether it is a home or work computer, the geographic location from which the request is issued, the strength of the connection between the computer and the requested resource (e.g., whether encryption is used in addition to signing, encryption strength), and/or other information. Once obtained, requester claims may be passed by the computer to the resource to which access is requested. The resource may request its own "resource claims," from the same and/or different claims providers, describing any of numerous attributes of the resource, such as its business sensitivity, stage of deployment, organizational ownership, and/or other information. Once resource claims have been obtained, they may be passed along with the requester claims to a policy decision point, which may evaluate information reflected in the claims to determine whether they comply with one or more access policies. If the result of the evaluation is that the request complies with an access control policy, then access may be granted, and if not, then access to the resource may be denied. As a result, claims may be employed to enable more flexible decision-making at the network layer than conventional approaches allow.

Figure 2:
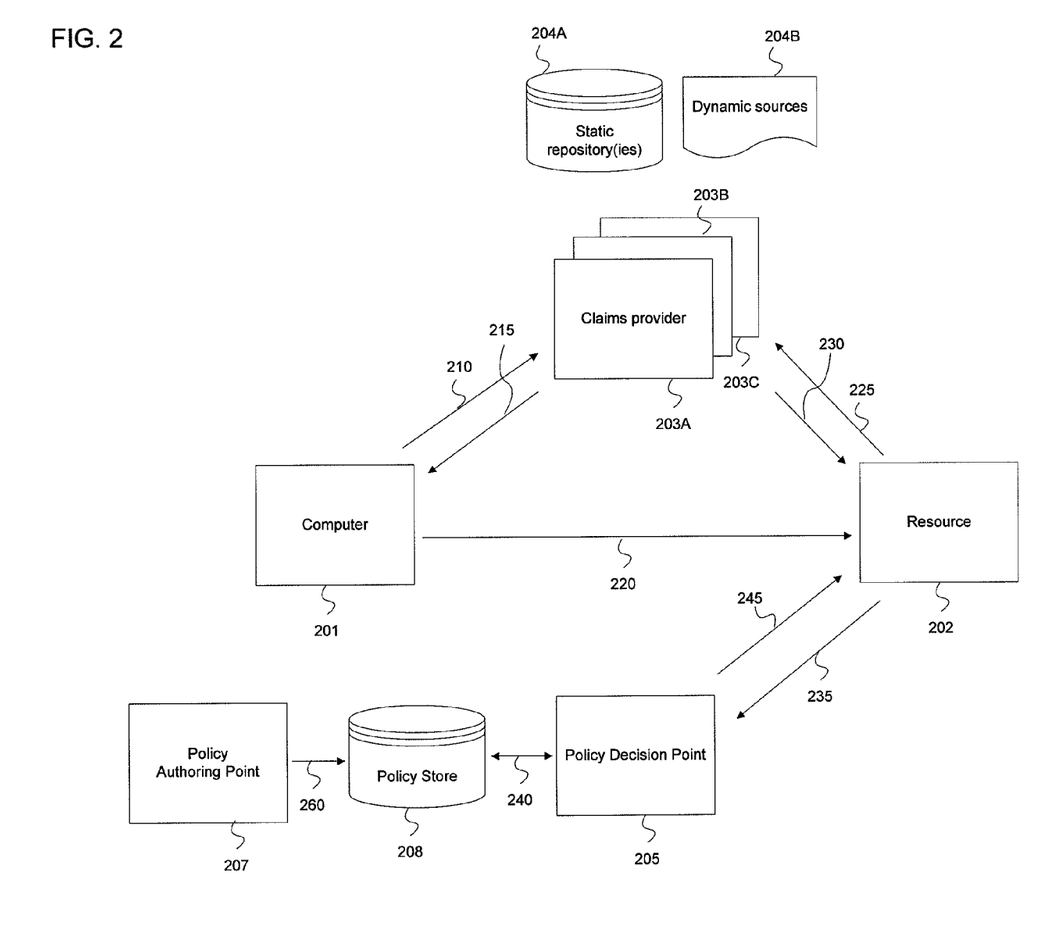
FIG. 2 is a block diagram depicting an example process employing claims whereby a client requests access to a network resource, in accordance with embodiments of the invention.

FIG. 2 depicts an example of this process in greater detail. In the example process shown in FIG. 2, a request by computer 201 (e.g., initiated by an application executing thereon, some other component or process, or a combination thereof) to access resource 202 (e.g., a host, service, some other component or process, or a combination thereof) results in computer 201 issuing a request in act 210 for requester claims to one or more claim providers 203. In some embodiments, a transfer protocol implemented on both computer 201 and resource 202 provides for computer 201 contacting claim providers 203 for requester claims.

In the example depicted, three claim providers are shown, labeled as claim providers 203A, 203B and 203C. However, it should be appreciated that any suitable number of claim providers may be employed, as the invention is not limited in this respect. For example, in some embodiments, multiple claim providers, each with a different system and/or organizational affiliation, may each provide a different type of claims. For example, one claim provider affiliated with a system that authenticates users may provide claims describing attributes of the user. Another claim provider affiliated with a system that verifies the health of computers requesting access may provide claims relating to system health. Another claim provider affiliated with a system that tracks the physical location of computers requesting access may provide claims relating to geographic location. Any suitable number of claim providers, and/or claim types, may be employed in the example system shown in FIG. 2, as embodiments of the invention are not limited to any particular implementation.

In addition, as shown in FIG. 2, each claim provider 203 may retrieve claims to be provided to computer 201 from a static claim repository 204A, a dynamic claim source 204B (e.g., one or more automated processes that generate(s) claims dynamically, one or more repositories on computer 201, resource 202, and/or another component, or some other dynamic claim source(s)), from both static and dynamic sources, or some other source(s). Embodiments of the invention are not limited to employing any particular source for claims or the information included therein.

In act 215, claim providers 203 provide one or more requester claims to computer 201. As noted briefly above, a claim may describe one or more attributes of computer 201, its user, the environment and context in which access is attempted, and/or other information. For example, a claim may include information relating to a user's identity, his/her role in an organization (e.g., a full-time employee, contractor, vendor, manager, etc.), organizational affiliation (e.g., sales department, finance, etc.), and/or any other information. Embodiments of the invention are not limited in the type of information that may be included in a claim.

If one or more requester claims include information relating to computer 201, that information may include any of information relating to the computer's health (e.g., whether the computer is equipped with security and/or anti-virus software, whether the software is activated, whether the computer employs an operational firewall, whether anti-virus signatures are up-to-date, etc.), the cryptographic strength of the connection between the device and the resource to which access is requested (e.g., whether signing and/or encrypted communications are used for communication, the type of encryption, etc.), an identifier for the computer, its role (e.g., a desktop computer, database server, web server, etc.), its organizational affiliation (e.g., operated by the sales department, finance department, etc.), and its owner (e.g., the company, an employee, a vendor, a public computer, etc.). Other information may be provided instead of, or in addition to, any or all of the items listed above.

If one or more requester claims include information relating to the computing environment and/or the access request, that information may include any one or more of the context in which access is attempted (e.g., from home, from work, from a branch office, while telecommunicating, etc.), and/or the user's physical geographic location (e.g., the country from which access is attempted). Other information may be provided instead of, or in addition to, the above. It should be appreciated that any suitable information may be provided in any number of requester claims, as the invention is not limited to any particular implementation.

In act 220, computer 201 provides the requester claims to resource 202, and resource 202 then requests resource claims from claim providers 203A-203C in act 225. Of course, it should be appreciated that the process shown in FIG. 2 is merely exemplary in this regard, and may be modified as appropriate. For example, resource 202 need not request resource claims in response to receiving requester claims from computer 201, as resource 202 may have previously obtained the resource claims, or some subset thereof, and may have them and/or the information included therein stored in a manner which facilitates quick retrieval (e.g., locally). Embodiments of the invention are not limited to any particular implementation.

Resource 202 also need not obtain claims from the same claim providers as those from which computer 201 obtains claims. A system implemented in accordance with embodiments of the invention may include any suitable number of claims providers, each of which may provide claims to any one or more components or entities. The invention is not limited to any particular implementation.

In act 230 of the example process 200 shown, resource claims are provided to resource 202. Of course, embodiments of the invention are not limited to performing in the manner depicted in FIG. 2. For example, in some embodiments, resource claims may be provided to computer 201, which may submit them to resource 202. Embodiments of the invention are not limited to any particular manner of providing resource claims to resource 202.

In some embodiments of the invention, upon receiving the resource claims, resource 202 may perform processing to determine whether the resource claims are (or remain) valid. This determination may be based upon any of numerous criteria. If resource 202 determines based on this processing that the claims are invalid, resource 202 may unilaterally deny computer 201 access.

The resource claims provided to resource 202 in act 230 may, for example, describe various attributes of resource 202, such as the resource's identity, its role (e.g., a desktop computer, database server, web server, etc.), its organizational affiliation (e.g., operated by the sales department, finance department, etc.), its owner (e.g., the company, an employee, a vendor, a public computer), its stage of deployment (e.g., setup, staging, production, etc.), its sensitivity (e.g., high, medium or low business impact), and/or other information. Resource claims may include other information instead of, or in addition to, the items of information listed above, as the invention is not limited to being implemented in any particular manner.

In the example process depicted in FIG. 2, resource 202 provides the requester and resource claims to policy decision point 205 in act 235. However, it should be appreciated that not all embodiments of the invention are so limited, as any one or more components may alternatively provide the requester and resource claims to policy decision point 205. For example, computer 201 could provide the requester and resource claims to policy decision point 205, after receiving the claims from resource 202. Embodiments of the invention are not limited to any particular implementation.

It should also be appreciated that although policy decision point 205 is depicted in FIG. 2 in a manner which suggests it is implemented on a separate physical component than resource 202, embodiments of the invention are not so limited. Policy decision point 205 may be implemented on any one or more suitable physical components, such as the same computer(s) on which resource 202 reside(s), any other component(s), or a combination thereof. Embodiments of the invention are not limited to any particular implementation.

Upon receiving the requester and resource claims, policy decision point 205 may evaluate the information provided in the claims with respect to one or more policies. In the example depicted, the one or more policies are retrieved from policy store 208 in act 240, which includes policies previously defined via policy authoring point 207 (symbolically defined in FIG. 2 as act 260; however, it should be appreciated that no temporal relationship or dependency exists between the specification of a policy and any other acts depicted in FIG. 2). Embodiments of the invention are not, however, limited to an implementation which includes retrieval when a request for an access control policy decision is received. For example, the policy(ies) or a subset thereof may have been previously retrieved, dynamically generated at the time of a request, or otherwise retrieved at a time other than when a policy decision is requested.

A policy may be defined in any suitable manner. In some embodiments of the invention, a policy may set forth criteria relating to access control decisions at any suitable level of granularity. For example, a policy may specify that access to [a host or service of particular sensitivity, such as "medium business impact"] at [a particular deployment stage, such as "production"] is to be granted when requested by a [user role, such as "vendor"] from [a location, such as "home"] using [a computer having a specified health indication, such as "having anti-virus software on"]. Of course, a policy need not set forth terms specifying that a grant of access is to occur if certain criteria are satisfied, as it may alternatively specify that access should be denied if certain criteria are satisfied, or that any suitable one or more actions is to occur or not occur if any one or more criteria are specified or not specified. A policy regarding access control decisions may be set forth in any suitable manner, and may employ any suitable information, at any suitable level of detail, provided in claims or otherwise, as the invention is not limited to any particular implementation.

In act 245, policy decision point 205 provides a policy decision to resource 202. For example, based on an evaluation of information included in the requester and/or resource claims, policy decision point 205 may instruct resource 202 to grant or deny access to computer 201. The process of FIG. 2 then completes.

It should be appreciated that an ability to govern access control decisions using information other than a health level of a requesting computer may provide network and system administrators with much more flexibility than conventional techniques afford. In this respect, while conventional network-level access control decisions are binary in nature, embodiments of the invention enable making decisions using more, and more detailed, information than is currently employed, providing greater decision-making latitude than information currently employed.

In some embodiments, any or all of the transfers of information described above with reference to FIG. 2 may be performed in accordance with the IPsec protocol suite, and the IPsec protocol suite may govern the enforcement of access controls during authentication. For example, aspects of the IPsec protocol suite that govern how information is communicated may be employed by components (e.g., computer 201, resource 202, and/or other components) to pass claim information, and aspects of the IPsec protocol suite that govern access control decision-making may be employed by any or all of these components to determine whether access is granted. As an example, computer 201 may obtain claims from one or more claims providers acting as a Security Token Service (STS) in accordance with IPsec. The computer authenticates to an STS using its or its user's identity, and specifies the "realm" in which it will use the claims, such as to connect with resource 202. An STS may issue the claims so that when the claims are passed to the policy decision point they may be verified. Claims may be embedded in a communication formatted in accordance with the IPsec protocol (as described further below) and sent to resource 202 so that an access control decision may be made.

Claims may be incorporated into a communication formatted to comply with IPsec in any of numerous ways, as the invention is not limited in this respect. In one example implementation, the certificate that is transferred from client to server in accordance with IPsec can be used to carry information from a requesting computer (e.g., computer 201, FIG. 2) to a resource (e.g., resource 202). For example, claims information included in a certificate may be used to generate a one or more artifacts that include the claims information. When the one or more artifacts are received by the resource, the resource may extract the claims information, and provide the information to the policy decision point for an access control decision to be made.

In another example implementation, an extension of IPsec known as "AuthIP" may be employed to enable use of the Kerberos protocol, which is well-known to those skilled in the security and authentication arts. In this example implementation, claims information received from a claims provider may be used to generate a Kerberos ticket having the claims information embedded therein. For example, one or more fields may be embedded into a Kerberos ticket for each claim. The AuthIP extension allows for a Kerberos ticket to be employed in a communication using IPsec, and so the AuthIP extension can be used to transfer claims information for use in authentication in accordance with IPsec.

In yet another example implementation, a new extension (e.g., an Internet Key Exchange (IKE) extension) may be created which provides for claims information to be transferred from a requesting computer to a resource in a manner that is different from that which is described above. Any suitable type of extension may be employed, as the invention is not limited in this respect.

It should be appreciated from the foregoing that any of numerous techniques may be employed to transfer and authenticate claims information in accordance with IPsec, including techniques not described above. Embodiments of the invention are not limited to any particular implementation.

It should also be appreciated that although the example implementations described above employ IPsec or aspects thereof to accomplish the transfer of claims information and authentication, embodiments of the invention are not so limited, as any one or more network layer security protocols may be employed. For example, embodiments of the invention may be implemented in a system that employs the Secure Sockets Layer (SSL) network layer security protocol, one or more other network layer security protocols, or a combination thereof.

Figure 3:
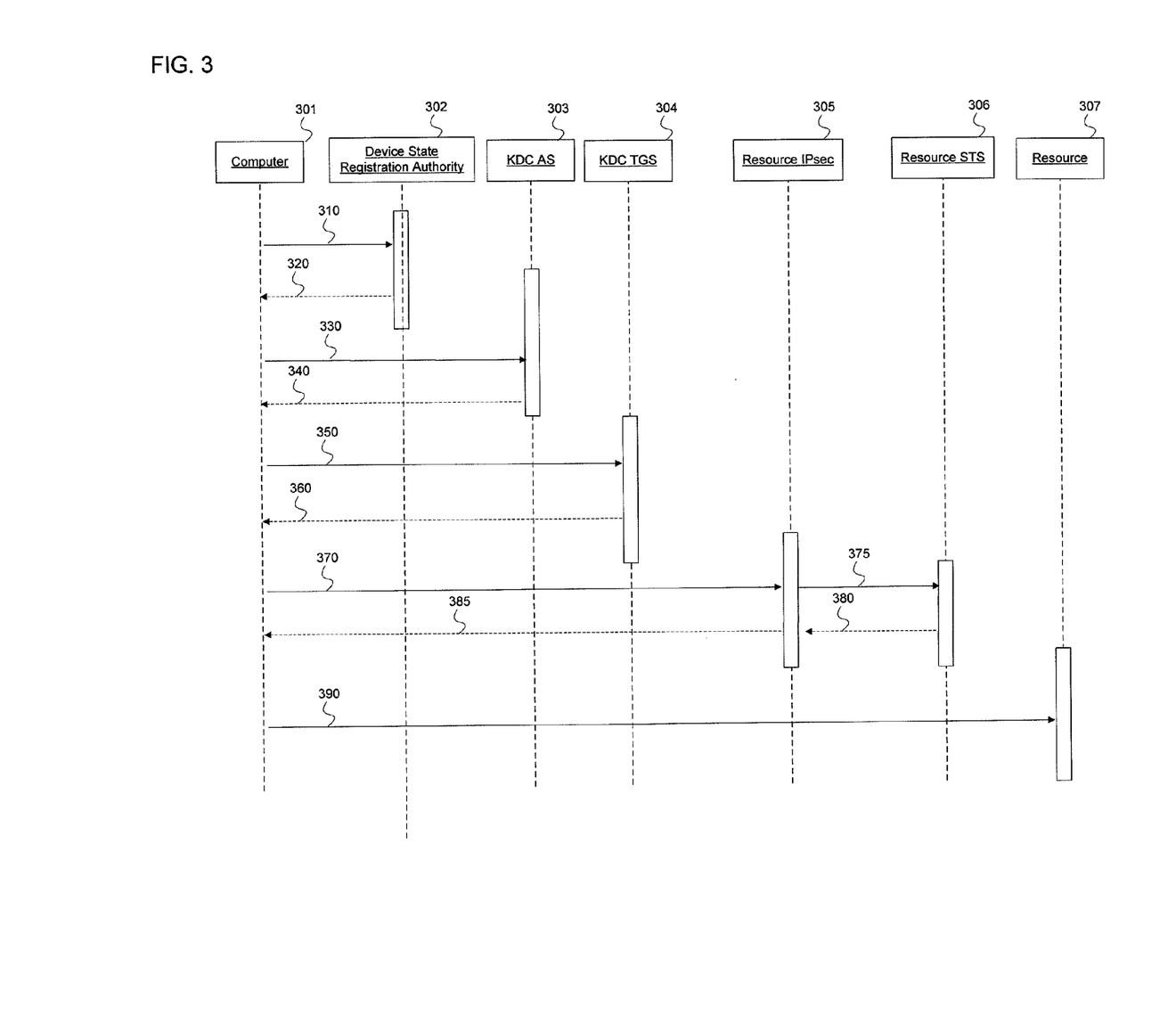
FIG. 3 is an activity diagram depicting an example process whereby a client's request to access a network resource is evaluated based on information included in claims, in accordance with embodiments of the invention.

FIG. 3 is an activity diagram that depicts the flow of information between various components in accordance with some embodiments of the invention. In particular, FIG. 3 depicts the flow of information between components in an implementation wherein the AuthIP extension of IPsec is used such that a Kerberos ticket is generated to include claims information based on a certificate from the requesting computer. Once the Kerberos ticket is obtained, it may then be used by the requesting device to request access to a network resource. FIG. 3 shows information being communicated between computer 301, Device State Registration Authority 302, key distribution center (KDC) authorization service (AS) 303, KDC ticket granting service (TGS) 304, resource 305, resource STS 306, and target service 307.

At the start of the example process shown in FIG. 3, in act 310, computer 301 sends a device state assessment to Device State Registration Authority 302 (acting as claim provider). Device State Registration Authority 302 evaluates the device state assessment to determine whether computer 301 complies with policy. In the example depicted in FIG. 3, computer 301 complies with policy, such that Device State Registration Authority responds by providing a machine certificate that incorporates claims information to computer 301 in act 320.

In act 330, computer 301 seeks compound authentication, of itself and its user, by sending KDC AS 303 the machine certificate sent to it in act 320 and user credentials provided by the user to computer 301. In act 340, KDC AS 303 responds by sending a ticket granting ticket (TGT) to computer 301, which the computer then uses in a request for a Kerberos ticket that is sent to KDC TGS 304 in act 350. In act 360, KDC TGS 304 responds to the request with a Kerberos ticket which includes claims information. Claims information may be embedded in a Kerberos ticket in any suitable fashion, as embodiments of the invention are not limited in this respect.

In act 370, computer 301 sends the Kerberos ticket with the claims information it received in act 320, to resource 305. The resource extracts the claims information, and requests its own claims from resource STS 306 in act 375. Resource STS 306 responds with resource claims in act 380, which the resource provides to a policy decision point to evaluate in light of one or more access control policies. An indication that the request complies with access control policy is provided to computer 301 in act 385. As such, computer 301 initiates access to target service 307 in act 390. The example process shown in FIG. 3 then completes.

It should be appreciated that the example processes depicted in FIGS. 2 and 3 may include acts other than those shown and described. (For example, the example process described above with reference to FIG. 3 does not include the processing of claims describing how computer 301 connects to target service 307, but other embodiments may include such processing.) Further, the order of the acts performed as part of these example processes may be different than the order illustrated and described. For example, other sequences of acts may be performed, certain acts may be performed in series or in parallel, as least partially, or other modifications to the example processes shown and described may be made. Embodiments of the invention are not limited to the particular implementation described herein.

Figure 4:
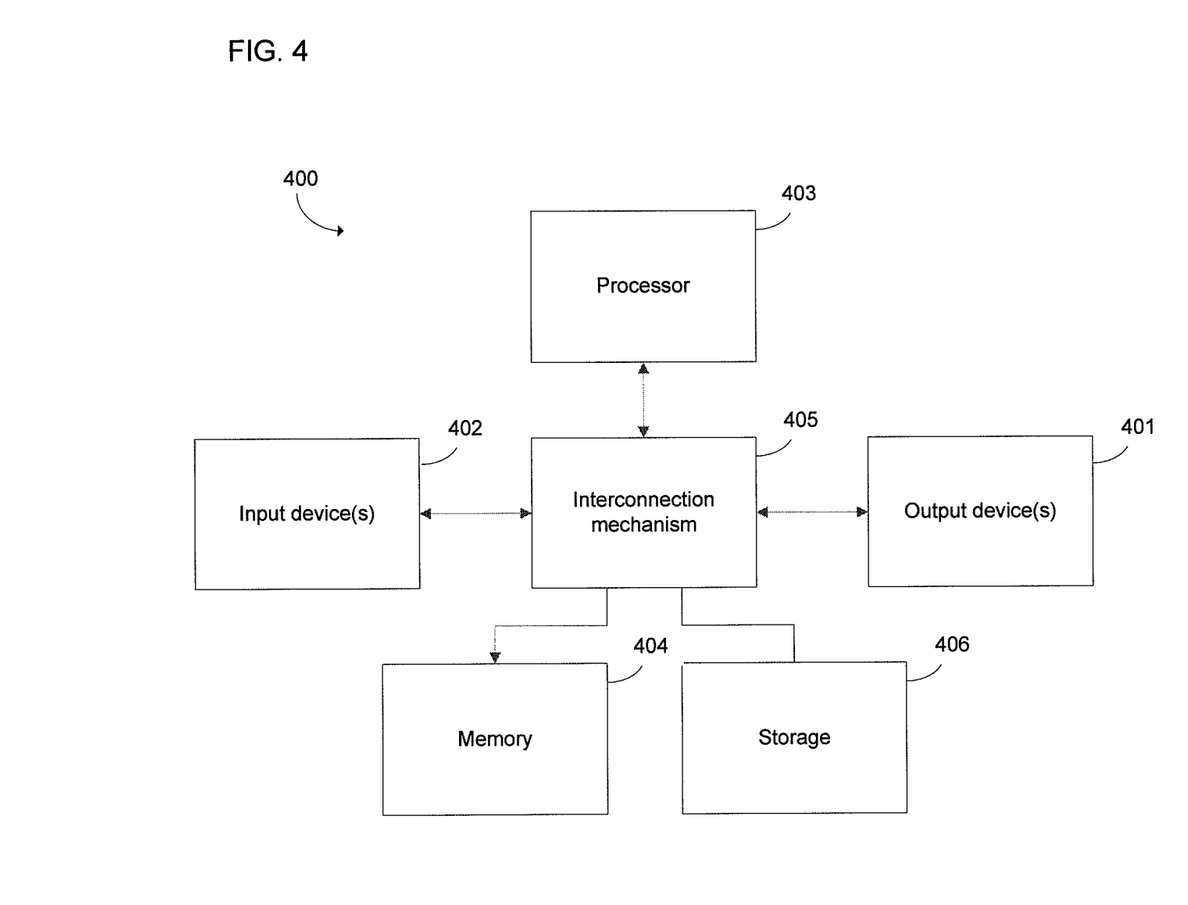
FIG. 4 is a block diagram depicting an example computer system on which some embodiments of the invention may be implemented.

Various aspects of the systems and methods for practicing features of the invention may be implemented on one or more computer systems, such as the exemplary computer system 400 shown in FIG. 4. Computer system 400 includes input device(s) 402, output device(s) 401, processor 403, memory system 404 and storage 406, all of which are coupled, directly or indirectly, via interconnection mechanism 405, which may comprise one or more buses, switches, networks and/or any other suitable interconnection. The input device(s) 402 receive(s) input from a user or machine (e.g., a human operator), and the output device(s) 401 display(s) or transmit(s) information to a user or machine (e.g., a liquid crystal display). The input and output device(s) can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

The processor 403 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

Processor 403 may also execute one or more computer programs to implement various functions. These computer programs may be written in any type of computer program language, including a procedural programming language, object-oriented programming language, macro language, or combination thereof. These computer programs may be stored in storage system 406. Storage system 406 may hold information on a volatile or non-volatile medium, and may be fixed or removable. Storage system 406 is shown in greater detail in FIG. 5.

Figure 5:
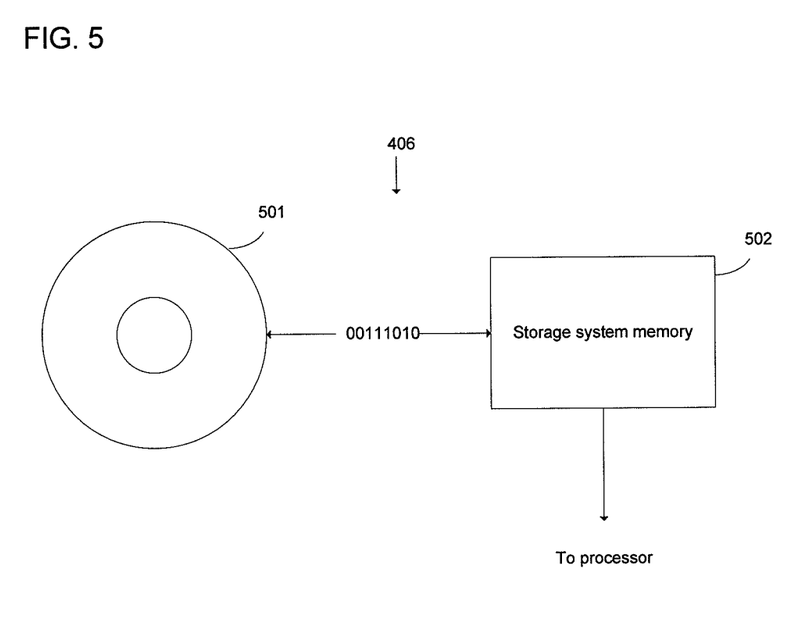
FIG. 5 is a block diagram depicting an example memory on which instructions embodying aspects of the present invention may be stored.

Storage system 406 may include a tangible computer-readable and -writable non-volatile recording medium 501, on which signals are stored that define a computer program or information to be used by the program. The recording medium may, for example, be disk memory, flash memory, and/or any other article(s) of manufacture usable to record and store information. Typically, in operation, the processor 403 causes data to be read from the nonvolatile recording medium 501 into a volatile memory 502 (e.g., a random access memory, or RAM) that allows for faster access to the information by the processor 403 than does the medium 501. The memory 502 may be located in the storage system 406 or in memory system 404, shown in FIG. 4. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited to any mechanism, whether now known or later developed. The invention is also not limited to a particular memory system 404 or storage system 406.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers and/or systems. Such processors may be implemented as integrated circuits, with one or more processors in an integrated circuit component, though a processor may be implemented using circuitry in any suitable format.

It should be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should also be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer-readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in the illustrative embodiments described herein.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for use in a system comprising a computer configured to communicate with a network resource via at least one network, the at least one network employing a network layer security protocol, the method comprising:
   receiving from the computer a request for one or more requester claims;
   providing the one or more requester claims to the computer in a first communication formatted to comply with the network layer security protocol, at least one of the one or more requester claims comprises attributes of one or more of the computer, the user of the computer, a context in which access by the computer to the network resource is requested, and an encryption strength of connection between the computer and the network resource, and an indication of whether the computer is associated with a home of a user of the computer;
   receiving from the network resource a request for one or more resource claims, at least one of the resource claims comprises attributes describing whether the resource has a high, medium, or low business impact, and whether or not the resource is at production stage;
   providing the one or more resource claims to the network resource in a second communication formatted to comply with the network layer security protocol;
   receiving a request for an access control policy decision, the request for the access control policy decision providing information included in the one or more requester claims and the one or more resource claims; and
   issuing the requested access control policy decision based at least in part on the provided information.

2. The method of claim 1, wherein receiving from the computer the request for one or more requester claims comprises receiving the request for one or more requester claims at a plurality of claim providers.

3. The method of claim 2, wherein receiving from the network resource the request for one or more resource claims comprises receiving the request for one or more resource claims at the same plurality of claim providers at which the request for one or more requester claims is received.

4. The method of claim 1, wherein receiving the request for the access control policy decision comprises receiving the request for the access control policy decision from the network resource.

5. The method of claim 1, wherein issuing the requested access control policy decision comprises accessing a static repository of policies and issuing the access control policy decision based at least in part on an evaluation of a policy retrieved from the static repository and the information received in the request for the access control policy decision.

6. The method of claim 1, wherein receiving from the computer the request for one or more requester claims comprises receiving the request from a client application executing on the computer.

7. The method of claim 1, wherein the network layer security protocol is IPsec employing an AuthIP extension to enable use of a Keberos protocol.

8. At least one computer-storage device having instructions stored thereon comprising:
   computer-executable instructions to receive first information associated with a computer requesting access to a network resource and included in a first communication formatted to comply with the network layer security protocol and comprises attributes associated with one or more of the computer, a user of the computer, a context in which access by the computer to the network resource is requested, an encryption strength of connection between the computer and the network resource, and an indication of whether the computer is associated with a home of the user of the computer;

computer-executable instructions to receive second information associated with the network resource and included in a second communication formatted to comply with the network layer security protocol and comprises attributes describing whether the resource has a high, medium, or low business impact, and whether or not the resource is at production stage;

computer-executable instructions to issue a decision to either grant or deny access by the computer to the network resource based at least in part on the first information and the second information.

9. The at least one computer-storage device of claim 8, wherein issuing the decision to either grant or deny access by the computer to the network resource comprises issuing the decision based also at least in part on a policy retrieved from a static repository.

10. The at least one computer-storage device of claim 9, further comprising instructions defining:

computer-executable instructions to present an interface enabling a user to author a policy for storage in the static repository.

11. The at least one computer-storage device of claim 9, wherein issuing the decision to either grant or deny access by the computer to the network resource is performed in response to request from the network resource for an access control policy decision.

12. The at least one computer-storage device of claim 8, wherein receiving first information comprises receiving claims comprising the information relating to the computer, and receiving second information comprises receiving claims comprising the information relating to the network resource.

13. A system, comprising:

a processing system comprising one or more processors, wherein the one or more processors are coupled to memory, configured to:

receive from a computer a first request, included in a first communication formatted to comply with a network layer security protocol, for one or more requester claims, the first request comprises attributes of one or more of the computer, the user of the computer, a context in which access by the computer to the network resource is requested, and an encryption strength of connection between the computer and the network resource, and an indication of whether the computer is associated with a home of a user of the computer;

receive from the network resource a second request, included in a second communication formatted to comply with a network layer security protocol, for one or more resource claims, the second communication comprises attributes associated with at least whether the resource has a high, medium, or low business impact, and whether or not the resource is at production stage;

receive a third request, included in a third communication formatted to comply with a network layer security protocol, for an access control policy decision, the third request providing information included in the one or more requester claims and the one or more resource claims; and issue the requested access control policy decision by the computer to the network resource based at least in part on the provided information.

14. The system of claim 13, further comprising a plurality of claim providers to provide the one or more requester claims to the computer in response to the first request and the one or more resource claims to the network resource in response to the second request.

15. The system of claim 13, wherein at least one of the one or more processor is arranged to create an Internet Key Exchange extension for transferring information from the computer to the network resource.

16. The system of claim 14, further comprising at least one dynamic claim source operable to generate the one or more requester claims using information included in the first request, and the one or more resource claims using information included in the second request.

17. The system of claim 13, further comprising a static repository in which is stored a plurality of policies, and wherein the at least one processor is programmed to access the static repository to retrieve a policy and issue the access control policy decision based also at least in part on the policy.

18. The system of claim 13, further comprising the network resource to which the computer requests access.

19. A method for use in a system comprising a computer configured to communicate with a network resource via at least one network, the at least one network employing a network layer security protocol, the method comprising:

receiving, from the computer, a request for first information associated with the computer;

providing the first information to the computer in a first communication formatted to comply with the network layer security protocol, the first information comprises attributes associated with one or more of the computer, a user of the computer, a context in which access by the computer to the network resource is requested, an encryption strength of connection between the computer and the network resource, and an indication of whether the computer is associated with a home of the user of the computer;

receiving from the network resource a request for second information associated with the network resource, the second information comprises attributes describing whether the resource has a high, medium, or low business impact, and whether or not the resource is at production stage;

providing the first information to the network resource in a second communication formatted to comply with the network layer security protocol;

receiving a request for an access control policy decision, the request for the access control policy decision providing information that is included in the first information and the second information; and issuing the requested access control policy decision based at least in part on the provided information.

20. The method of claim 1, wherein the one or more resource claims describe attributes of one or more of an organization to which the network resource is affiliated, an owner of the network resource, and a stage of deployment of the network resource.

* * * * *